United States Patent
Deng et al.

(10) Patent No.: US 8,990,600 B2
(45) Date of Patent: Mar. 24, 2015

(54) ELECTRONIC DEVICE WITH STANDBY MODE

(75) Inventors: Xue-Bing Deng, Shenzhen (CN); Tao Wang, Shenzhen (CN); Hai-Long Cheng, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 491 days.

(21) Appl. No.: 13/430,706

(22) Filed: Mar. 27, 2012

(65) Prior Publication Data

US 2013/0246822 A1 Sep. 19, 2013

(30) Foreign Application Priority Data

Mar. 15, 2012 (CN) .......................... 2012 1 0068315

(51) Int. Cl.
*G06F 1/26* (2006.01)
*G06F 1/32* (2006.01)

(52) U.S. Cl.
CPC .................................. *G06F 1/3203* (2013.01)
USPC ......................................... 713/320; 320/135

(58) Field of Classification Search
USPC .......................... 713/300, 310, 320, 330, 340
See application file for complete search history.

(56) References Cited

U.S. PATENT DOCUMENTS

| | | | |
|---|---|---|---|
| 6,061,528 A | 5/2000 | Ichihara et al. | |
| 6,242,892 B1 * | 6/2001 | Arnaud et al. | 320/135 |
| 6,590,597 B1 * | 7/2003 | Kim | 715/866 |
| 2005/0041360 A1 | 2/2005 | Dettweiler | |

* cited by examiner

*Primary Examiner* — Kim Huynh
*Assistant Examiner* — Paul J Yen
(74) *Attorney, Agent, or Firm* — Novak Druce Connolly Bove + Quigg LLP

(57) ABSTRACT

An electronic device with standby state includes a MCU, a voltage conversion unit, a screen lock circuit, and a power-saving trigger circuit. The voltage conversion unit is connected to the MCU and is used to convert a power supply voltage to a suitable voltage to power the MCU. The screen lock circuit includes a switch, therein, the screen lock circuit is connected to the MCU and is used to lock or unlock the electronic device in response to an operation on the switch when the electronic device is in a work state. The power-saving trigger circuit is connected to the MCU, the voltage conversion unit, and the screen lock circuit, and is used to disable or enable the voltage conversion unit in response to the operation on the switch when the electronic device is in the standby state.

5 Claims, 1 Drawing Sheet

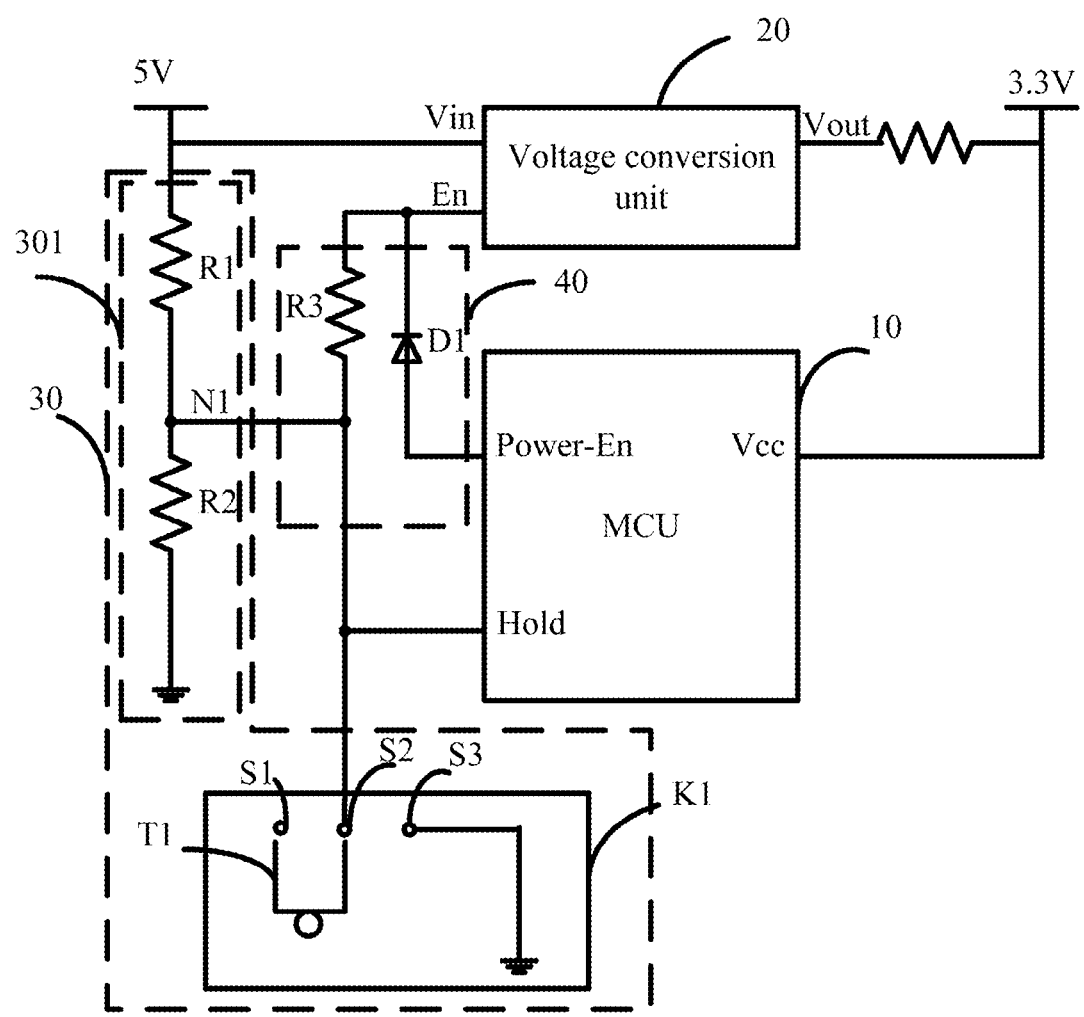

ELECTRONIC DEVICE WITH STANDBY MODE

BACKGROUND

1. Technical Field

The present disclosure relates to electronic devices, particularly, to an electronic device with a standby mode.

2. Description of Related Art

Many electronic devices, such as mobile phones and digital photo frames have a Micro Control Unit (MCU). When those electronic devices enter a standby state, the MCU continues to use power to be available to maintain some functions. However, if there are no functions to maintain then the power used by the MCU is wasted.

Therefore, it is desirable to provide an electronic device to overcome the described limitations.

BRIEF DESCRIPTION OF THE DRAWINGS

Many aspects of the present disclosure are better understood with reference to the drawing. The components in the drawing are not necessarily drawn to scale, the emphasis instead being placed upon clearly illustrating the principles of the present disclosure.

The drawing is a circuit diagram of an electronic device with standby state, in accordance with an exemplary embodiment.

DETAILED DESCRIPTION

Embodiments of the present disclosure will now be described in detail, with reference to the accompanying drawings.

Referring to the drawing, an electronic device 1 with a standby state includes an MCU 10, a voltage conversion unit 20, a screen lock circuit 30, and a power-saving trigger circuit 40. The voltage conversion unit 20 is connected to the MCU 10, and is used to convert a power supply voltage to a suitable voltage to power the MCU 10. In the embodiment, the voltage conversion unit 20 converts a power supply voltage of 5 volts to 3.3 volts to power the MCU 10. The screen lock circuit 30 is also connected to the MCU 10 and includes a switch K1. The screen lock circuit 30 locks or unlocks the electronic device 1 in response to operating the switch K1 when the electronic device is on. The power-saving trigger circuit 40 is connected to the MCU 10, the voltage conversion unit 20, and the screen lock circuit 30. When the electronic device 1 is in the standby state, the power-saving trigger circuit 40 can disable or enable the voltage conversion unit 20 in response to operating the switch K1.

As shown in the drawing, the MCU 10 includes a power pin Vcc, a state pin Power-En, and a screen lock control pin Hold. The voltage conversion unit 20 includes an input port Vin, an output port Vout, and an enable terminal En. The input port Vin is connected to a power port 5V-HD. The output port Vout is connected to the power pin Vcc of the MCU 10. In the embodiment, the power port 5V-HD is connected to an anode terminal of a battery or an adapter, and then provides the power supply voltage. The voltage conversion unit 20 is enabled when the enable terminal En is at high voltage, and is disabled when the enable terminal En is at low voltage.

The screen lock circuit 30 also includes a voltage output circuit 301. The voltage output circuit 301 includes resistors R1 and R2 which are connected between the power port 5V-HD and ground. A connection node N1 of the resistor R1 and the resistor R2 is connected to the screen lock control pin Hold of the MCU 10. In the embodiment, the switch K1 is a slide switch and includes a movable contact spring T1 and three static contacts S1, S2, and S3. The movable contact spring T1 enables a connection between the static contact S1 and the static contact S2, or enables a connection between the static contact S2 and the static contact S2 in response to operating the switch K1.

In the embodiment, the static contact S1 is suspended, the static contact S2 is connected to the screen lock control pin Hold of the MCU 10 and the connection node N1, and the static contact S3 is grounded. When the movable contact spring T1 enables the connection between the static contact S1 and the static contact S2, the connection node N1 outputs a high voltage, and the screen lock control pin Hold of the MCU 10 connected to the connection node N1 is at high voltage too, and the MCU 10 unlocks the electronic device 1 when the screen lock control pin Hold is at high voltage. When the movable contact spring T1 enables the connection between the static contact S2 and the static contact S3, the screen lock control pin Hold of the MCU 10 is grounded and at low voltage, and the MCU 10 locks the electronic device 1 when the screen lock control pin Hold is at low voltage.

In the embodiment, the state pin Power-En of the MCU 10 outputs a high voltage when the electronic device is in a work state, and outputs a low voltage when the electronic device is in the standby state.

The power-saving trigger circuit 40 includes a resistor R3 and a diode D1. The resistor R3 is connected between the screen lock control pin Hold of the MCU 10 and the enable pin En of the voltage conversion unit 20, the diode D1 is connected between the state pin Power-En of the MCU 10 and the enable pin En of the voltage conversion unit 20, and conducts the power from the state pin Power-En to the enable pin En.

When the electronic device 1 is in the work state, the state pin Power-En of the MCU 10 outputs a high voltage to the enable pin En of the voltage conversion unit 20 and enables the voltage conversion unit 20. During the time when the electronic device is in the work state, when the switch K1 is operated to cause the connection between the static contact S2 and the static contact S3 to be established, the screen lock control pin Hold of the MCU 10 is grounded and the MCU 10 locks the electronic device 1 accordingly. When the switch K1 is operated to cause the connection between the static contact S1 and the static contact S2 to be established, the screen lock control pin Hold of the MCU 10 is at high voltage and the MCU 10 unlocks the electronic device 1 accordingly. Then the electronic device 1 can be locked or unlocked as usual when the electronic device 1 is in the work state.

When the electronic device 1 is in the standby state, as described above, the state pin Power-En of the MCU 10 outputs a low voltage. When the switch K1 is operated to cause the connection between the static contact S2 and the static contact S3 to be established, the enable terminal En of the voltage conversion unit 20 is grounded via the resistor R3, then the voltage conversion unit 20 is disabled and discontinues the power to the MCU 10. When the switch K1 is operated to cause the connection between the static contact S1 and the static contact S2 to be established, because there is the diode D1 connected between the state pin Power-En and the enable terminal En, the enable terminal En of the voltage conversion unit 20 obtains the high voltage from the connection node N1, then the voltage conversion unit 20 is enabled again and provides power to the MCU 10.

Therefore, the electronic device 1 can discontinue the power to the MCU 10 in response to operating the switch K1 of the screen lock circuit when the electronic device 1 enters the standby state.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device with standby state, comprising:
   a micro control unit (MCU);
   a voltage conversion unit, connected to the MCU and configured to convert a power supply voltage to a suitable voltage to power the MCU;
   a screen lock circuit comprising a switch, wherein the screen lock circuit is connected to the MCU and locks or unlocks the electronic device in response to an operation on the switch when the electronic device is in a work state; and
   a power-saving trigger circuit, connected to the MCU, the voltage conversion unit, and the screen lock circuit, and configured to disable or enable the voltage conversion unit in response to operating the switch when the electronic device is in the standby state;
   wherein the power-saving trigger circuit comprises a first resistor and a diode, the first resistor is connected between a screen lock control in of the MCU and an enable pin of the voltage conversion unit, the diode is connected between a state pin of the MCU and the enable pin of the voltage conversion unit, and conducts the power from the state pin to the enable pin.

2. The electronic device according to claim 1, wherein the screen lock circuit further comprises a voltage output circuit, the voltage output circuit comprises a second resistor and a third resistor which are connected between a power port and ground; a connection node of the first resistor and the second resistor is connected to the screen lock control pin of the MCU; the switch comprises a movable contact spring, a first static contact, a second static contact, and a third static contact, the movable contact spring enables a connection between the first static contact and the second static contact, or enables a connection between the second static contact and the third static contact in response to the operating on the switch.

3. The electronic device according to claim 2, wherein the first static contact is suspended, the second static contact is connected to the screen lock control pin of the MCU and the connection node, the third static contact is grounded.

4. The electronic device according to claim 3, wherein the voltage conversion unit is enabled when the enable terminal is at high voltage, and is disabled when the enable terminal En is at low voltage, the state pin of the MCU outputs a high voltage when the electronic device is at work state, and outputs a low voltage when the electronic device is in the standby state; when the electronic device is in the standby state, if the switch is operated to cause the connection between the second static contact and the third static contact to be established, the enable terminal of the voltage conversion unit is grounded the first resistor, then the voltage conversion unit is disabled and discontinue the power to the MCU.

5. The electronic device according to claim 3, wherein the voltage conversion unit is enabled when the enable terminal is at high voltage, and is disabled when the enable terminal is at low voltage, the state pin of the MCU outputs a high voltage when the electronic device is at work state, and outputs a low voltage when the electronic device is in the standby state; when the electronic device is in the standby state, if the switch is operated to cause the connection between the first static contact and the second static contact to be established, the enable terminal of the voltage conversion unit obtains a high voltage from the connection node, then the voltage conversion unit is enabled and provides the power to the MCU.

\* \* \* \* \*